United States Patent
Chiba et al.

(10) Patent No.: US 6,980,707 B2
(45) Date of Patent: Dec. 27, 2005

(54) WAVEGUIDE TYPE VARIABLE OPTICAL ATTENUATOR

(75) Inventors: Takafumi Chiba, Tokyo (JP); Satoshi Takasugi, Tokyo (JP); Tetsu Hasegawa, Tokyo (JP); Hisato Uetsuka, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 146 days.

(21) Appl. No.: 10/653,918

(22) Filed: Sep. 4, 2003

(65) Prior Publication Data

US 2004/0047583 A1 Mar. 11, 2004

(30) Foreign Application Priority Data

Sep. 6, 2002 (JP) .......................... 2002-261555
Apr. 21, 2003 (JP) .......................... 2003-115502

(51) Int. Cl.[7] .............................. G02B 6/00
(52) U.S. Cl. ..................... 385/11; 385/14; 385/49; 385/140; 398/152
(58) Field of Search .................. 385/11, 14, 48, 385/49, 140; 398/152

(56) References Cited

U.S. PATENT DOCUMENTS

| | | | |
|---|---|---|---|
| 5,956,437 A | 9/1999 | Day et al. | |
| 6,760,499 B2 * | 7/2004 | Pezeshki et al. | 385/14 |
| 6,870,972 B2 * | 3/2005 | Miyata et al. | 385/11 |
| 2003/0039461 A1 * | 2/2003 | Chun et al. | 385/140 |
| 2003/0123777 A1 * | 7/2003 | Miyata et al. | 385/11 |
| 2003/0180027 A1 * | 9/2003 | Oaknin et al. | 385/140 |
| 2004/0240765 A1 * | 12/2004 | Wooten et al. | 385/2 |

FOREIGN PATENT DOCUMENTS

JP  11-249089  9/1999

* cited by examiner

*Primary Examiner*—Sung Pak
(74) *Attorney, Agent, or Firm*—McGinn IP Law Group, PLLC (57) ABSTRACT

A waveguide type variable optical attenuator has: a substrate; two optical circuits that are in parallel formed on the substrate, each of the optical circuits including two couplers that conduct the branching and coupling of light and are connected to the input port and output port of light and two waveguides through which the two couplers are connected; a polarization maintaining fiber one end of which is connected to the output port of one of the two optical circuits and the other end of which is connected to the input port of the other of the two optical circuits while being twisted 90°; and a heater that is provided around neighboring waveguides of the two optical circuits such that the neighboring waveguides share heat to be generated by the heater.

12 Claims, 8 Drawing Sheets

WAVEGUIDE TYPE VARIABLE OPTICAL ATTENUATOR

The present application is based on Japanese patent application Nos. 2002-261555 and 2003-115502, the entire contents of which are incorporated herein by reference.

BACKGROUND OF THE INVENTION

1. Field of the Invention

This invention relates a waveguide type variable optical attenuator for optical communications, and particularly to a waveguide type variable optical attenuator that has low consumption power and low polarization dependency.

2. Description of the Related Art

The waveguide type variable optical attenuator for optical communications functions such that light with an intensity Pin is attenuated to light with an arbitrary intensity Pout (Pin>Pout).

Figure 1:
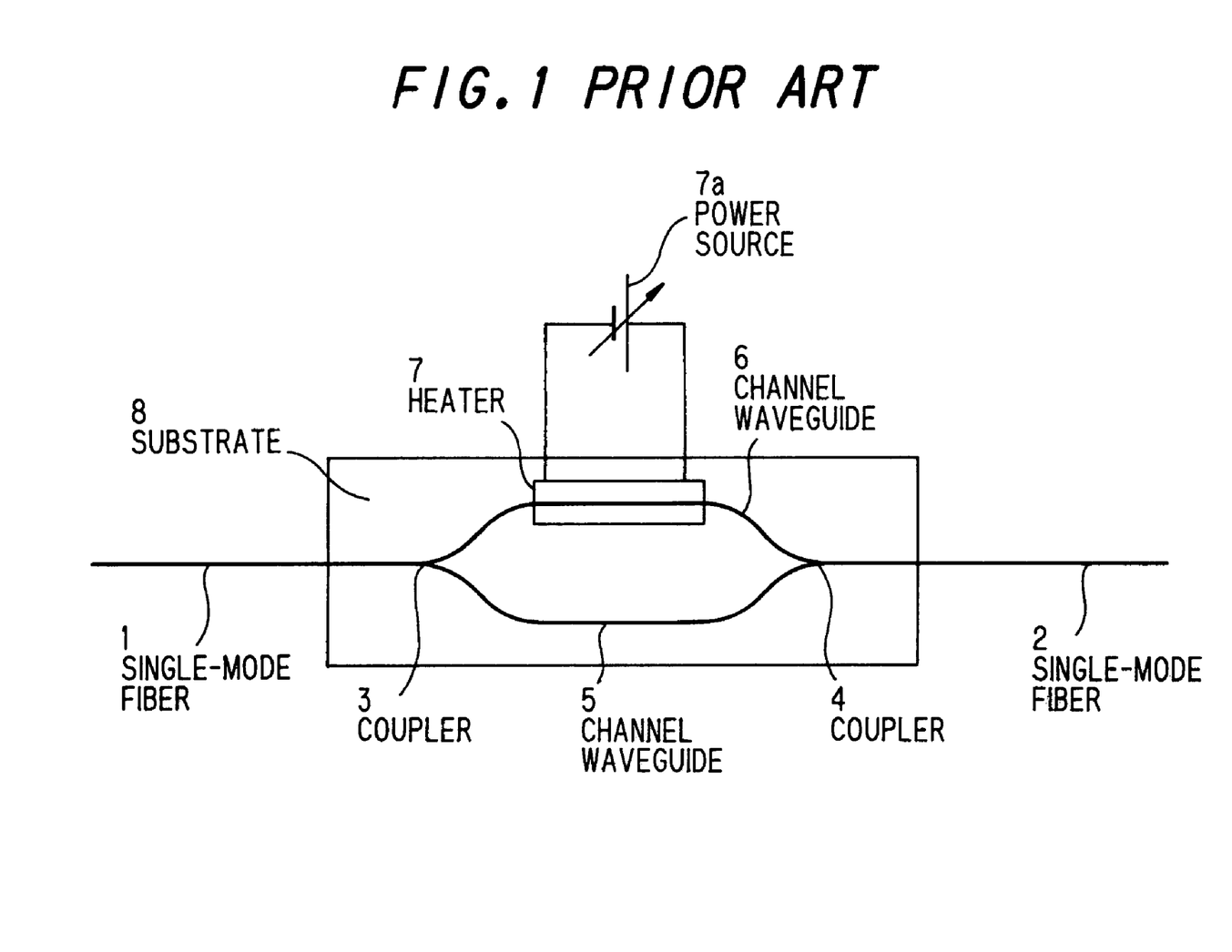
FIG. 1 is a plan view showing the composition of the conventional waveguide type variable optical attenuator.

FIG. 1 shows a conventional waveguide type variable optical attenuator that its variable optical attenuator is composed using waveguides. On a substrate 8 of silica, there are provided couplers 3, 4 and two channel waveguides 5, 6 connecting the couplers 3 and 4, which compose a symmetrical Mach-Zehnder optical circuit. Also, On one channel waveguide 6, there is provided a heater 7 that is connected with a power source 7a. Such a composition is, for example, disclosed in Japanese patent application laid-open No.11-249089 and U.S. Pat. No. 5,956,437.

The coupler 3 branches light being propagated through a single-mode fiber 1, so that one is outputted to the channel waveguide 6 and the other is outputted to the channel waveguide 5. The coupler 4 couples the lights being propagated through the channel waveguides 5, 6 and then outputs it to a single-mode fiber 2. The power source 7a can variably control the electric power supplied to the heater 7. The heater 7 generates heat that increases according to the power supplied from the power source 7a, and the channel waveguide 6 is heated by that heat.

However, in the conventional waveguide type variable optical attenuator, there is a problem that the birefringence of the channel waveguide 6 increases by the heating of the heater 7 and the PDL (polarization dependent loss) increases as the attenuation ratio increases.

Figure 2A:
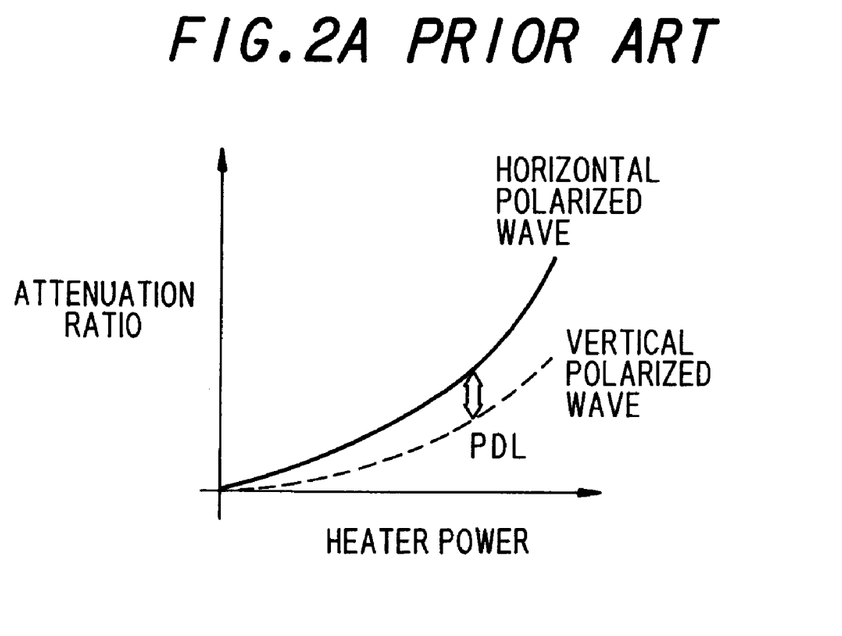
FIG. 2A is a graph showing the relationship between the heater power and the attenuation ratio of the waveguide type variable optical attenuator in FIG. 1.
Figure 2B:
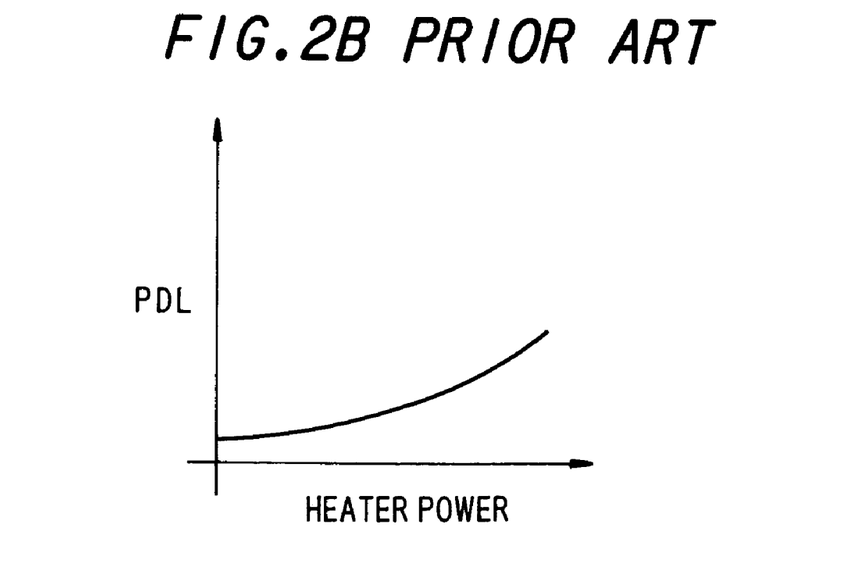
FIG. 2B is a graph showing the relationship between the heater power and the PDL of the waveguide type variable optical attenuator in FIG. 1.

FIG. 2A shows the relationship between the heater power and the attenuation ratio of the waveguide type variable optical attenuator in FIG. 1, and FIG. 2B shows the relationship between the heater power and the PDL of the waveguide type variable optical attenuator in FIG. 1. As shown in FIG. 2A, according as the attenuation ratio increases due to an increase in the heater power, the difference (PDL) of attenuation ratio between, of light components to be propagated through the channel waveguide 6, polarized wave (vertical polarized wave) vertical to the substrate 8 and polarized wave (horizontal polarized wave) horizontal thereto becomes greater. Namely, as shown in FIG. 2B, the PDL increases according as the heater power increases.

Accordingly, due to this polarization dependency, it is difficult to obtain an attenuation ratio more than 30 dB.

Figure 3:
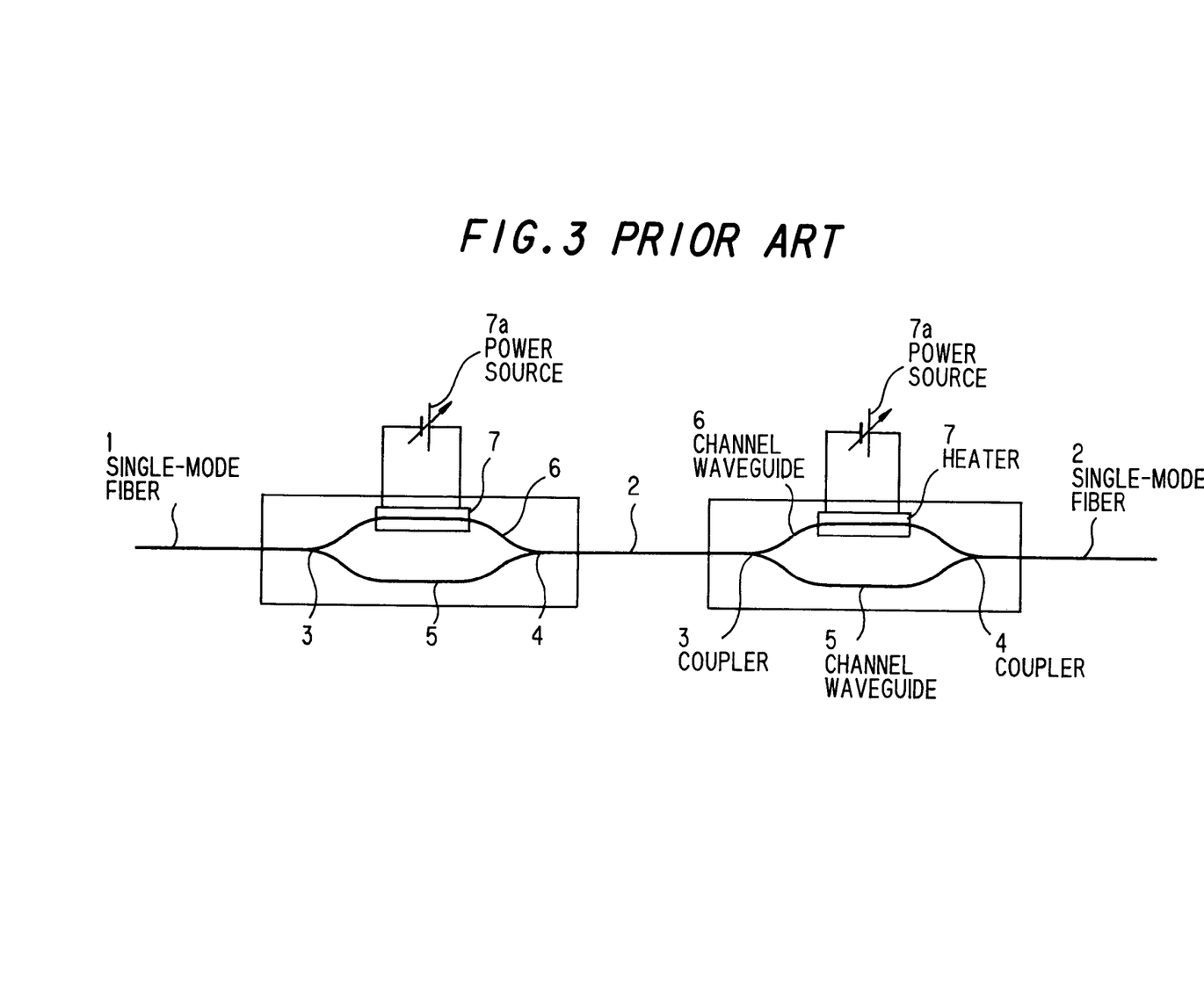
FIG. 3 is a plan view showing the tandem configuration of the conventional waveguide type variable optical attenuator.

FIG. 3 shows a waveguide type variable optical attenuator that the two waveguide type variable optical attenuators shown in FIG. 1 are connected optically in tandem. The waveguide type variable optical attenuator thus configured may give an attenuation ratio more than 30 dB. However, in this configuration, there is a problem that the two waveguide type variable optical attenuators cause an increase in consumption power.

SUMMARY OF THE INVENTION

It is an object of the invention to provide a waveguide type variable optical attenuator that can give an attenuation ratio more than 30 dB while reducing the PDL as well as suppressing an increase in consumption power.

According to a first aspect of the invention, a waveguide type variable optical attenuator, comprising:

a substrate;

two optical circuits that are in parallel formed on the substrate, each of the optical circuits including two couplers that conduct the branching and coupling of light and are connected to the input port and output port of light and two waveguides through which the two couplers are connected;

a polarization maintaining fiber one end of which is connected to the output port of one of the two optical circuits and the other end of which is connected to the input port of the other of the two optical circuits while being twisted 90°; and a heater that is provided around neighboring waveguides of the two optical circuits such that the neighboring waveguides share heat to be generated by the heater.

According to a second aspect of the invention, a waveguide type variable optical attenuator, comprising:

a substrate;

two optical circuits that are in parallel formed on the substrate, each of the optical circuits including two couplers that conduct the branching and coupling of light and are connected to the input port and output port of light and two waveguides through which the two couplers are connected;

a single-mode fiber that is wound like a coil such that it has the same function as a half wavelength plate, one end of the single-mode fiber being connected to the output port of one of the two optical circuits, and the other end of the single-mode fiber being connected to the input port of the other of the two optical circuits, the direction of coil being adjusted such that polarized wave to be inputted to the single-mode fiber is outputted while being rotated 90°; and a heater that is provided around neighboring waveguides of the two optical circuits such that the neighboring waveguides share heat to be generated by the heater.

According to a third aspect of the invention, a waveguide type variable optical attenuator, comprising:

a substrate;

two optical circuits that are in parallel formed on the substrate, each of the optical circuits including two couplers that conduct the branching and coupling of light and are connected to the input port and output port of light and two waveguides through which the two couplers are connected;

a first polarization maintaining fiber one end of which is connected to the output port of one of the two optical circuits;

a second polarization maintaining fiber one end of which is connected to the input port of the other of the two optical circuits, the s-axis directions of the first and second polarization maintaining fibers coinciding with each other at the output port and input port of the two optical circuits, the other end of the first polarization maintaining fiber being connected with the other end of the second polarization maintaining fiber such that the s-axis directions of the first and second polarization maintaining fibers are orthogonal to each other; and a heater that is provided around neighboring waveguides of the two optical circuits such that the neighboring waveguides share heat to be generated by the heater.

According to a fourth aspect of the invention, a waveguide type variable optical attenuator, comprising:

a substrate;

two optical circuits that are in parallel formed on the substrate, each of the optical circuits including two couplers that conduct the branching and coupling of light and are connected to the input port and output port of light and two waveguides through which the two couplers are connected;

a single-mode fiber that is connected to the input port of one of the two optical circuits;

a polarization maintaining fiber one end of which is connected to the output port of one of the two optical circuits and the other end of which is connected to the input port of the other of the two optical circuits while being twisted 90°;

a single-mode fiber that is connected to the output port of the other of the two optical circuits; and a heater that is provided around neighboring waveguides of the two optical circuits such that the neighboring waveguides share heat to be generated by the heater.

According to a fifth aspect of the invention, a waveguide type variable optical attenuator, comprising:

a substrate;

two optical circuits that are in parallel formed on the substrate, each of the optical circuits including two couplers that conduct the branching and coupling of light and are connected to the input port and output port of light and two waveguides through which the two couplers are connected;

a single-mode fiber that is connected to the input port of one of the two optical circuits;

a single-mode fiber that is wound like a coil such that it has the same function as a half wavelength plate, one end of the single-mode fiber being connected to the output port of one of the two optical circuits, and the other end of the single-mode fiber being connected to the input port of the other of the two optical circuits, the direction of coil being adjusted such that polarized wave to be inputted to the single-mode fiber is outputted while being rotated 90°;

a single-mode fiber that is connected to the output port of the other of the two optical circuits; and a heater that is provided around neighboring waveguides of the two optical circuits such that the neighboring waveguides share heat to be generated by the heater.

In the above waveguide type variable optical attenuators, the two waveguides of each of the two optical circuits may have unequal lengths.

Meanwhile, the s-axis means a slow axis of a polarization maintaining fiber herein. In other words, it means, of two axes to compose the polarization maintaining fiber, one axis along which light to propagate through the polarization maintaining fiber runs slower.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 4:
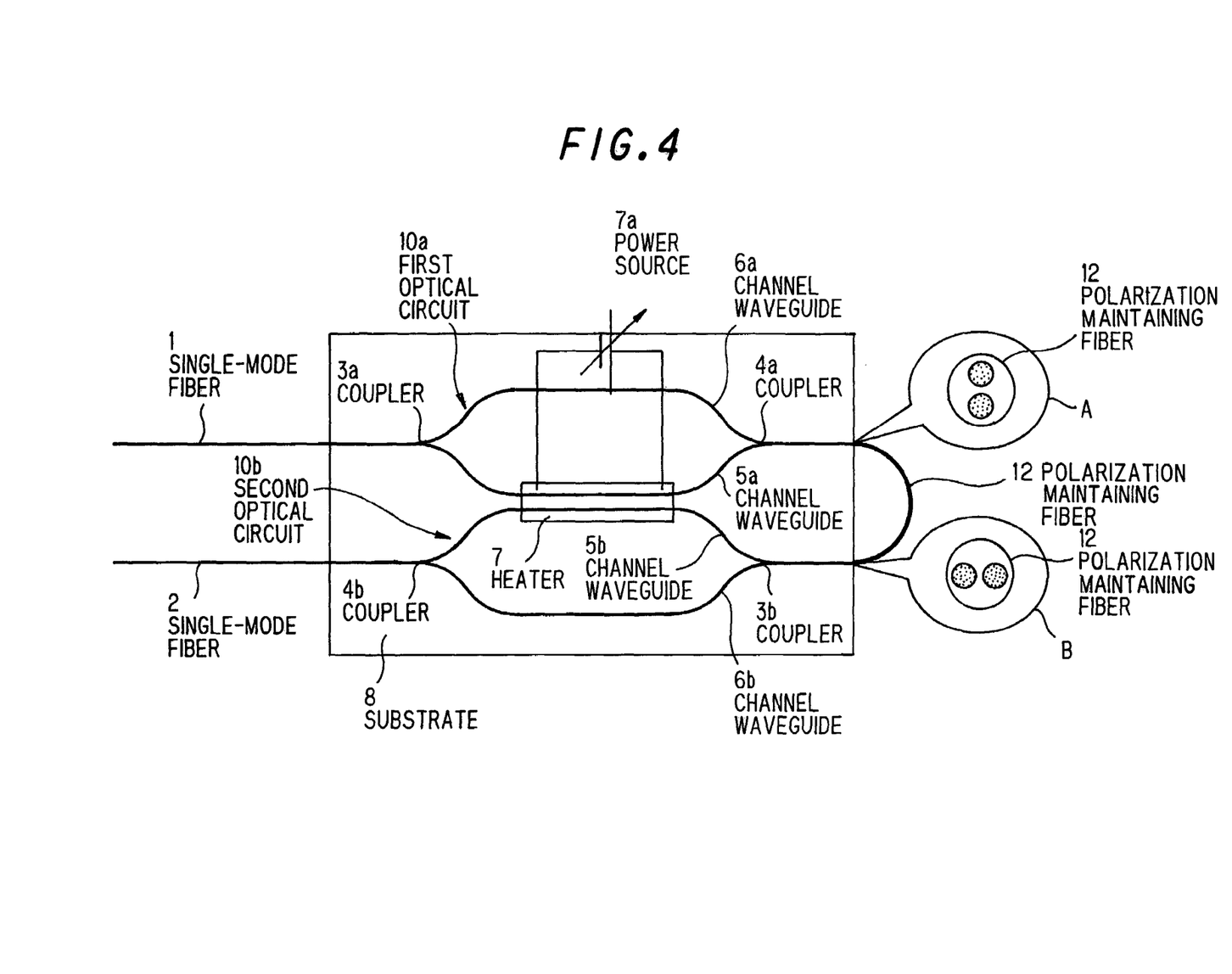
FIG. 4 is a plan view showing a waveguide type variable optical attenuator in a preferred embodiment according to the invention.

FIG. 4 shows a waveguide type variable optical attenuator in the preferred embodiment according to the invention. The waveguide type variable optical attenuator includes: a first symmetrical Mach-Zehnder optical circuit (herein referred to as first optical circuit) 10a; a second symmetrical Mach-Zehnder optical circuit (herein referred to as second optical circuit) 10b, the first and second optical circuits being in parallel installed on a substrate 8 of silica; a heater 7 that is connected to a power source 7a, the heater being shared by the first and second optical circuits, a single-mode fiber 1 that is connected to input port at one end of the first optical circuit 10a; a single-mode fiber 2 that is connected to output port at one end of the second optical circuit 10b; and a polarization maintaining fiber 12 that is connected to the other ends of the first and second optical fibers 10a, 10b.

In detail, the first optical circuit 10a is composed of a pair of couplers 3a, 4a, and two channel waveguides 5a, 6a that are provided between the couplers 3a and 4a, the channel waveguides 5a, 6a having a same length. Also, the second optical circuit 10b is composed of a pair of couplers 3b, 4b, and two channel waveguides 5b, 6b that are provided between the couplers 3b and 4b, the channel waveguides 5b, 6b having a same length.

The heater 7 with a predetermined length is provided on both of the neighboring channel waveguides 5a, 5b while being along the channel waveguides 5a, 5b.

The single-mode fiber 1 is connected to the input port, which is connected with the coupler 3a, of the first optical circuit 10a. The polarization maintaining fiber 12 is connected to the output port, which is connected with the coupler 3b, of the first optical circuit 10a. The polarization maintaining fiber 12 is, as shown by enlarged part B in FIG. 4, connected to the input port, which is connected with the coupler 3b, of the first optical circuit 10a while being rotated 90°. In other words, one end of the polarization maintaining fiber 12 is, as shown by enlarged part A in FIG. 4, connected to the output port of the first optical circuit 10a with its s-axis positioned horizontally (i.e., parallel to the paper face on which FIG. 4 is drawn), and the other end is, as shown by the enlarged part B in FIG. 4, connected to the input port of the second optical circuit 10b with its s-axis positioned vertically (i.e., vertically to the paper face on which FIG. 4 is drawn). The single-mode fiber 2 is connected to the output port, which is connected with the coupler 4b, of the second optical circuit 10b.

Figure 5A:
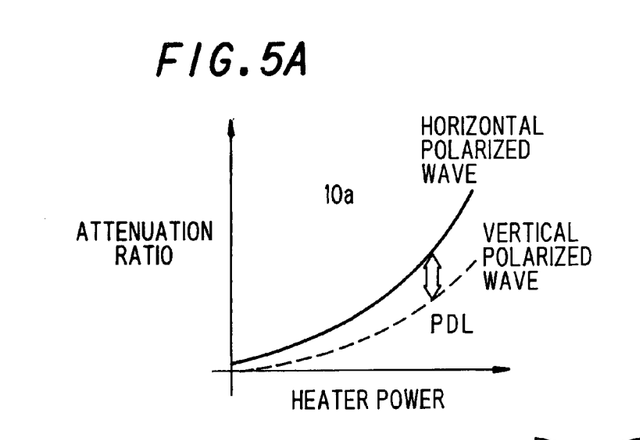
FIG. 5A is a graph showing the relationship between the heater power and the attenuation ratio of a first optical circuit of the waveguide type variable optical attenuator in FIG. 4.

In operation, light being inputted through the single-mode fiber 1 is branched by the coupler 3a, then outputted through the respective channel waveguides 5a, 6a to the polarization maintaining fiber 12. On this occasion, the birefringence index of the channel waveguide 5a changes by heating of the heater 7. Therefore, as shown in FIG. 5A, there occurs a difference (PDL: polarization dependent loss) in attenuation ratio between vertical polarized wave to the substrate 8 and horizontal polarized wave to the substrate 8 in the light propagating through the channel waveguide 5a. As shown, the horizontal polarized wave has an attenuation ratio greater than that of the vertical polarized wave.

Figure 5B:
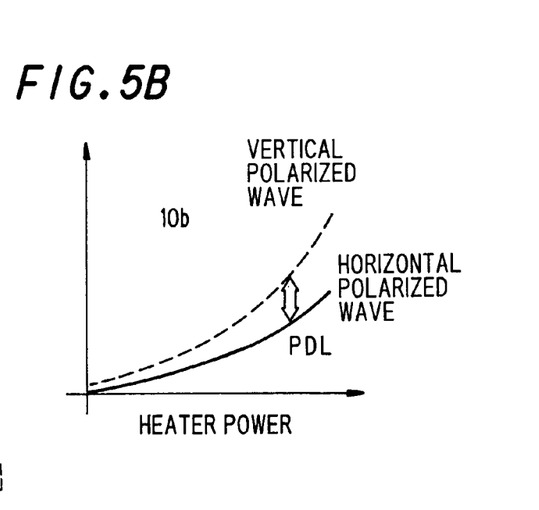
FIG. 5B is a graph showing the relationship between the heater power and the attenuation ratio of a second optical circuit of the waveguide type variable optical attenuator in FIG. 4.
Figure 5C:
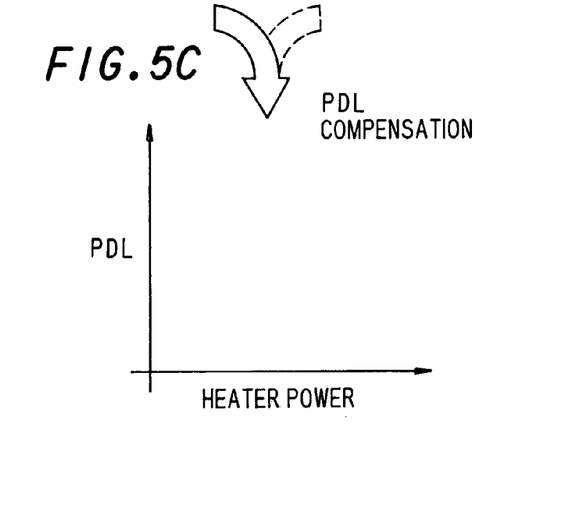
FIG. 5C is a graph showing the relationship between the heater power and the PDL of the waveguide type variable optical attenuator in FIG. 4.

Light to propagate through the polarization maintaining fiber 12 is inputted to the second optical circuit 10b while having the horizontal polarization component and vertical polarization component in the first optical circuit 10a exchanged each other due to the 90° rotation in connection of the polarization maintaining fiber 12. The light being inputted is branched by the coupler 3b, then outputted through the respective channel waveguides 5b, 6b to the single-mode fiber 2. The channel waveguide 5b is, by the heater 7, subject to the same variation in birefringence as the channel waveguide 5a of the first optical circuit 10a. Because of this, as shown in FIG. 5B, there occurs a difference (PDL) in attenuation ratio, whose amount is the same as that in the first optical circuit 10a, between vertical polarized wave and horizontal polarized wave in the light propagating through the channel waveguide 5b. In this case, the horizontal/vertical polarization components in the first optical circuit 10a are exchanged each other due to the 90° rotation in connection of the polarization maintaining fiber 12, and the PDL generated in the first optical circuit 10a is therefore compensated as shown in FIG. 5C. Thus, whatever the level of attenuation ratio is, the PDL can be compensated to zero.

Also, the waveguide type variable optical attenuator in this embodiment can have the same attenuation ratio while enjoying consumption power less than the conventional tandem configuration shown in FIG. 3 since both of the optical circuits 10a, 10b are driven by the heater 7.

Figure 6:
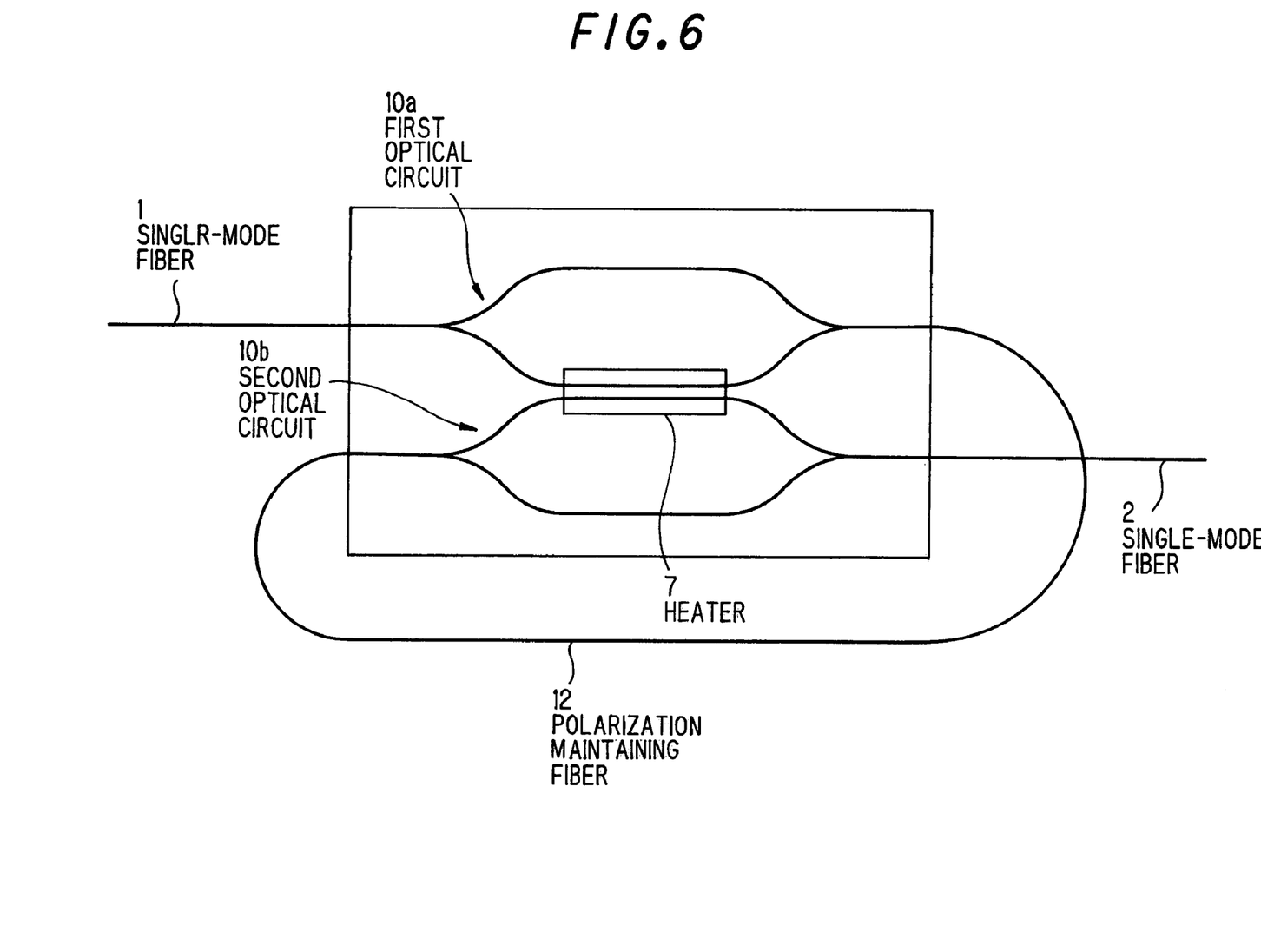
FIG. 6 is a plan view showing a first modification of the waveguide type variable optical attenuator in FIG. 4.

FIG. 6 shows a first modification of the waveguide type variable optical attenuator in the embodiment. As shown, the polarization maintaining fiber 12 may be connected to the different input port of the second optical circuit 10b from that shown in FIG. 4. Even in this configuration, the same effect and function as those of the configuration in FIG. 4 can be obtained.

Figure 7:
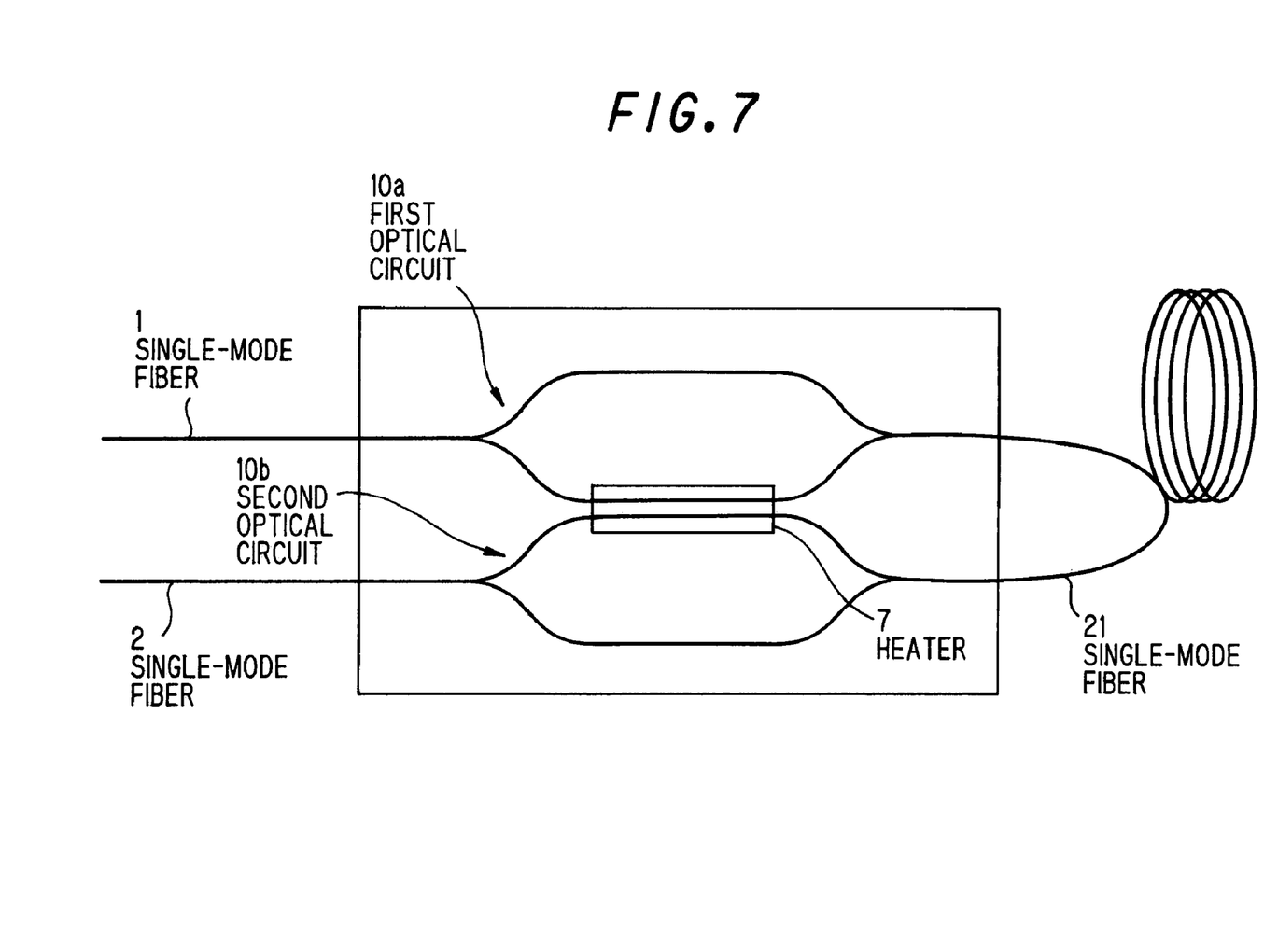
FIG. 7 is a plan view showing a second modification of the waveguide type variable optical attenuator in FIG. 4.

FIG. 7 shows a second modification of the waveguide type variable optical attenuator in the embodiment. As shown, instead of the polarization maintaining fiber 12, an ordinary single-mode fiber 21 that is wound like a coil may be employed. The single-mode fiber 21 has the same function as a half wavelength plate, and the direction of coil can be adjusted such that the polarization is exchanged between the first optical circuit 10a and the second optical circuit 10b. Also in this configuration, the same effect and function as those of the configuration in FIG. 4 can be obtained.

In the above configurations as shown in FIGS. 4, 6 and 7, the channel waveguides 5a, 6a (or 5b, 6b) of the optical circuit 10a (or 10b) have an equal length. However, even when they have lengths different from each other, the same effect and function mentioned above can be obtained.

Figure 8:
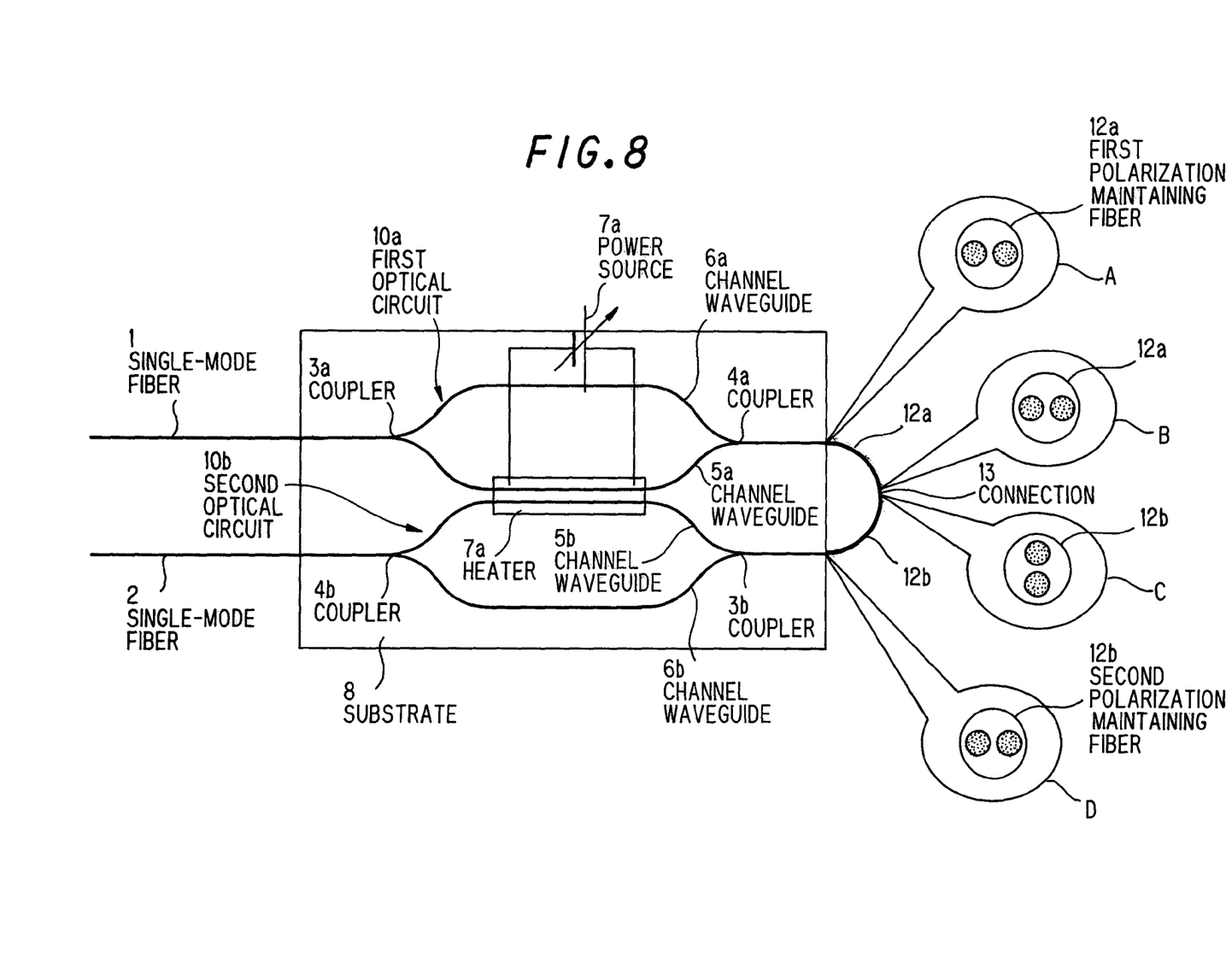
FIG. 8 is plan view showing a third modification of the waveguide type variable optical attenuator in FIG. 4.

FIG. 8 shows a third modification of the waveguide type variable optical attenuator in the embodiment. As shown, instead of the polarization maintaining fiber 12 in FIG. 4, two polarization maintaining fibers 12a, 12b may be employed.

In the third modification, one end of the first polarization maintaining fiber 12a is connected to the output port, which is connected with the coupler 4a, of the first optical circuit 10a, and one end of the second polarization maintaining fiber 12b is connected to the input port, which is connected with the coupler 3b, of the second optical circuit 10b. Further, the other end of the first polarization maintaining fiber 12a is connected to the other end of the second polarization maintaining fiber 12b. The s-axis directions of the first and second polarization maintaining fiber 12a, 12b are as shown by enlarged parts A–D in FIG. 8. Namely, the one end of the polarization maintaining fiber 12a and the one end of the polarization maintaining fiber 12b are connected to the output port, which is connected with the coupler 4a, of the first optical circuit 10a and to the input port, which is connected with the coupler 3b, of the second optical circuit 10b, respectively such that the s-axis directions of them coincide with each other (See enlarged parts A and D in FIG. 8). In this modification, the s-axis directions of the polarization maintaining fibers 12a, 12b are both made to be vertical (i.e., vertical to the paper face on which FIG. 8 is drawn).

On the other hand, the other end of the first polarization maintaining fiber 12a and the other end of the second polarization maintaining fiber 12b are connected abutting on with each other such that the s-axes of them are orthogonal to each other (See enlarged parts B and C in FIG. 8). In this modification, the second polarization maintaining fiber 12b is connected with the other end of the first polarization maintaining fiber 12a while being twisted 90° (See enlarged part C in FIG. 8, which shows the s-axis direction of the second polarization maintaining fiber 12b at a connection 13). Alternatively, the first polarization maintaining fiber 12a may be twisted 90°, or the first polarization maintaining fiber 12a may be twisted 45° and the second polarization maintaining fiber 12b may be twisted 45° to the opposite direction. In other words, the s-axes of the first and second polarization maintaining fibers 12a, 12b may be orthogonal to each other at the connection 13.

In the third modification, the first polarization maintaining fiber 12a has the same length as the second polarization maintaining fiber 12b. The other ends of the first and second polarization maintaining fibers 12a, 12b are connected with each other by fusion bonding at the connection 13.

The other components in the third modification are the same as those in FIG. 4 and, therefore, the explanation of them is omitted here.

The third modification can enjoy the same effect and function as those in the embodiment as shown in FIG. 4, and the first and second modifications. Moreover, in the third modification, the difference between the optical path lengths of vertical polarized wave and horizontal polarized wave that propagate through the polarization maintaining fiber becomes substantially zero. Therefore, the polarization mode dispersion (PMD) can be minimized. In this regard, the third modification is more advantageous than the above embodiment as shown in FIG. 4, and the first and second modifications.

[Advantages of the Invention]

In this invention, even when there occurs a difference (PDL) in attenuation ratio between vertical polarized wave and horizontal polarized wave of light to propagate through one optical circuit, the light is inputted to the other optical circuit with its horizontal and vertical components exchanged each other by means of the polarization maintaining fiber. In the other optical circuit, a same PDL occurs to the exchanged horizontal and vertical components of light. Therefore, the PDL generated in the previous optical circuit can be compensated in the subsequent optical circuit. Accordingly, the waveguide type variable optical attenuator of the invention can give an attenuation ratio more than 30 dB while reducing the PDL as well as suppressing an increase in consumption power.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A waveguide type variable optical attenuator, comprising:
   a substrate;
   two optical circuits that are in parallel formed on said substrate, each of said optical circuits including two couplers that conduct the branching and coupling of light and are connected to an input port and an output port of light and two waveguides through which said two couplers are connected;
   a polarization maintaining fiber one end of which is connected to the output port of one of said two optical circuits and the other end of which is connected to the input port of the other of said two optical circuits while being twisted 90°; and
   a heater that is provided around neighboring waveguides of said two optical circuits such that the neighboring waveguides share heat to be generated by said heater.

2. A waveguide type variable optical attenuator, comprising:
   a substrate;
   two optical circuits that are in parallel formed on said substrate, each of said optical circuits including two couplers that conduct branching and coupling of light and are connected to an input port and an output port of light and two waveguides through which said two couplers are connected;
   a single-mode fiber that is wound like a coil such that it has a same function as a half wavelength plate, one end of said single-mode fiber being connected to the output port of one of said two optical circuits, and the other end of said single-mode fiber being connected to the input port of the other of said two optical circuits, a direction of coiling being adjusted such that a polarized wave to be inputted to the single-mode fiber is outputted while being rotated 90°; and
   a heater that is provided around neighboring waveguides of said two optical circuits such that the neighboring waveguides share heat to be generated by said heater.

3. The waveguide type variable optical attenuator according to claim 1, wherein:
   said two waveguides of each of said two optical circuits have unequal lengths.

4. The waveguide type variable optical attenuator according to claim 2, wherein:
   said two waveguides of each of said two optical circuits have unequal lengths.

5. A waveguide type variable optical attenuator, comprising:
   a substrate;
   two optical circuits that are in parallel formed on said substrate, each of said optical circuits including two couplers that conduct branching and coupling of light and are connected to an input port and an output port of light and two waveguides through which said two couplers are connected;
   a first polarization maintaining fiber one end of which is connected to the output port of one of said two optical circuits;
   a second polarization maintaining fiber one end of which is connected to the input port of the other of said two optical circuits, the s-axis directions of said first and second polarization maintaining fibers coinciding with each other at the output port and input port of said two optical circuits, the other end of said first polarization maintaining fiber being connected with the other end of said second polarization maintaining fiber such that the s-axis directions of said first and second polarization maintaining fibers are orthogonal to each other; and
   a heater that is provided around neighboring waveguides of said two optical circuits such that the neighboring waveguides share heat to be generated by said heater.

6. The waveguide type variable optical attenuator according to claim 5, wherein:
   said first polarization maintaining fiber has the same length as said second polarization maintaining fiber.

7. The waveguide type variable optical attenuator according to claim 5, wherein:
   said two waveguides of each of said two optical circuits have unequal lengths.

8. The waveguide type variable optical attenuator according to claim 6, wherein:
   said two waveguides of each of said two optical circuits have unequal lengths.

9. A waveguide type variable optical attenuator, comprising:
   a substrate;
   two optical circuits that are in parallel formed on said substrate, each of said optical circuits including two couplers that conduct the branching and coupling of light and are connected to an input port and an output port of light and two waveguides through which said two couplers are connected;
   a single-mode fiber that is connected to the input port of one of said two optical circuits;
   a polarization maintaining fiber one end of which is connected to the output port of one of said two optical circuits and the other end of which is connected to the input port of the other of said two optical circuits while being twisted 90°;
   a single-mode fiber that is connected to the output port of the other of said two optical circuits; and
   a heater that is provided around neighboring waveguides of said two optical circuits such that the neighboring waveguides share heat to be generated by said heater.

10. A waveguide type variable optical attenuator, comprising:
    a substrate;
    two optical circuits that are in parallel formed on said substrate, each of said optical circuits including two couplers that conduct branching and coupling of light and are connected to an input port and an output port of light and two waveguides through which said two couplers are connected;

a single-mode fiber that is connected to the input port of one of said two optical circuits;

a single-mode fiber that is wound like a coil such that it has a same function as a half wavelength plate, one end of said single-mode fiber being connected to the output port of one of said two optical circuits, and the other end of said single-mode fiber being connected to the input port of the other of said two optical circuits, a direction of coiling being adjusted such that polarized wave to be inputted to the single-mode fiber is outputted while being rotated 90°;

a single-mode fiber that is connected to the output port of the other of said two optical circuits; and a heater that is provided around neighboring waveguides of said two optical circuits such that the neighboring waveguides share heat to be generated by said heater.

11. The waveguide type variable optical attenuator according to claim 9, wherein:
said two waveguides of each of said two optical circuits have unequal lengths.

12. The waveguide type variable optical attenuator according to claim 10, wherein:
said two waveguides of each of said two optical circuits have unequal lengths.

* * * * *